United States Patent [19]

Kawawaki et al.

[11] Patent Number: 5,155,815
[45] Date of Patent: Oct. 13, 1992

[54] COMPUTER IN WHICH DATA HOME IS CHANGEABLE IN ANY MODE

[75] Inventors: Fumiaki Kawawaki, Yamatokoriyama; Noboru Akizuki, Nara; Taizou Nishida, Yamatokoriyama, all of Japan

[73] Assignee: Sharp Kabushiki Kaisha, Japan

[21] Appl. No.: 405,688

[22] Filed: Sep. 11, 1989

[30] Foreign Application Priority Data

Sep. 12, 1988 [JP] Japan ................ 63-227743

[51] Int. Cl.⁵ .............................................. G06F 13/00
[52] U.S. Cl. ............... 395/325; 364/DIG. 1; 364/232.9; 364/261.5
[58] Field of Search ... 364/200 MS File, 900 MS File; 395/275, 325, 425, 725, 775

[56] References Cited

U.S. PATENT DOCUMENTS

| | | | |
|---|---|---|---|
| 4,079,459 | 3/1978 | Grant, Jr. ...................... | 364/200 |
| 4,156,918 | 5/1979 | Olander, Jr. et al. .......... | 364/200 |
| 4,287,560 | 9/1981 | Forbes et al. ................. | 364/200 |
| 4,402,056 | 8/1983 | Sado et al. .................... | 364/900 |
| 4,530,068 | 7/1985 | Nakanishi et al. ............. | 364/900 |

FOREIGN PATENT DOCUMENTS 3824718 2/1989 Fed. Rep. of Germany.
58-205271 11/1983 Japan.

*Primary Examiner*—Thomas M. Heckler
*Attorney, Agent, or Firm*—Morrison & Foerster

[57] ABSTRACT

A computer or calculator which can use a retrieved data in any position of an expression. The computer has a calculation mode and a data retrieval mode, and comprises an X register for an input data, and a Y register for an operand. In the computer, the contents of the X register is loaded into the Y register when a predetermined key operation is conducted in the calculation mode, and then the mode of the computer is set to the data retrieval mode. A retrieved data is loaded into the X register, and the mode of the computer returns to the calculation mode.

2 Claims, 10 Drawing Sheets

| | KEY OPERATION | DISPLAY |
|---|---|---|
| ① | [2ndF] [DATA] | NAME?<br>0. |
| ② | [D] [O] [L] [L] [A] [R] | DOLLAR _<br>0. |
| ③ | [2ndF] [▲▼] [1] [2] [0] | DOLLAR<br>120. |
| ④ | [ENT] | NAME?<br>0. |
| ⑤ | [C·CE] | 0. |
| ⑥ | [1] [.] [6] [X] | 1.6 |
| ⑦ | [▽] ··· [▽] | DOLLAR<br>120. |
| ⑧ | [=] | 192. |

FIG. 3

| | KEY OPERATION | DISPLAY |
|---|---|---|
| ① | 123  M+ | M<br>123. |
| ② | C·CE | M<br>0. |
| ③ | 2  + | M<br>2. |
| ④ | RM | 123. |
| ⑤ | = | 125. |

"M" MEANS THAT THE MEMORY CONTAINS DATA

| | KEY OPERATION | DISPLAY |
|---|---|---|
| ① | [MEMO] | NAME? |
| ② | [D] [O] [L] [L] [A] [R] | DOLLAR _ |
| ③ | [▲▼] | DOLLAR<br>_ |
| ④ | [1] [2] [3] | DOLLAR<br>123 _ |
| ⑤ | [ENT] | NAME? |
| ⑥ | [▽] ··· [▽] | DOLLAR<br>123 |
| ⑦ | [+] | 123. |
| ⑧ | 2  [=] | 125 |

FIG. 7

COMPUTER IN WHICH DATA HOME IS CHANGEABLE IN ANY MODE

BACKGROUND OF THE INVENTION

1. Field of the invention:

The present invention relates to a computer, and more particularly, to a small electronic computer such as a hand-held calculator, an electronic organizer, a scientific calculator, or the like.

2. Description of the prior art:

Generally, a small electronic computer such as a hand-held calculator is designed to be capable of temporarily storing numeric data or a calculation result in a memory and performing calculation by using the numeric data thus stored in the memory.

FIG. 6 shows an example of an operation scheme of a calculation in a hand-held calculator in which such a memory function is used. The example shown in FIG. 6 is a calculation of "2 + (Memory)", where "(Memory)" denotes the contents of a data stored in a memory ("123" in this case). The calculation operation is executed in the following sequence:

(1) A numeric value "123" is stored in the memory.
(2) The display is cleared.
(3) "2 +" is input.
(4) The numeric value stored in the memory is read out therefrom to be set as an operand.
(5) An equal [=] key is pressed to execute the calculation, and the result is displayed.

Such a hand-held calculator is also capable of executing the calculation in the sequence reverse to that shown in FIG. 6 (i.e., the calculation of "(Memory) + 2").

Another small computer such as a hand-held scientific calculator is designed to be capable of attaching a data name to a numeric data when storing the numeric data in a memory, and to be further capable of sorting and/or retrieving the data by the data name. FIG. 7 shows an example of an operation scheme of a calculation of "(Memory) + 2" in such a scientific calculator in which a numeric data with a data name attached thereto is stored in a memory. The calculation operation is executed in the following sequence:

(1) A memory [MEMO] key is pressed to set the mode of the calculator to the data storage mode.
(2) A data name ("DOLLAR" in this case) is input.
(3) A cursor key is operated so as to enable the input of the contents of a data.
(4) The contents of the data "123" are input.
(5) An entry [ENT] key is pressed to store the input data.
(6) A forward data search [∇] key is pressed to retrieve the desired data by the data name "DOLLAR". The retrieved data is displayed.
(7) A plus [+] key is pressed to make the calculation the state "(Memory) +".
(8) A numeric key "2" is pressed to execute the calculation of "(Memory) +2".

With the memory function used in such a conventional calculator, it is possible to store numeric data itself, but it is not possible to store it with a data name attached thereto. Therefore, the user must memorize the meaning of the stored data, thus increasing the possibility that the user cannot understand the meaning of the retrieved data.

On the other hand, in a computer capable of storing data with a data name attached thereto, it is impossible to retrieve a desired data by a data name in the course of a calculation to use it in the calculation. Thus, such a computer cannot execute a calculation requiring the input of a data after an operator (e.g., "2 + (Memory)"). Therefore, such a computer requires that the data be retrieved by a data name at the beginning of an arithmetical expression (e.g., "(Memory) + 2"), resulting in that the memory function may not be used depending on the contents of the expression.

Furthermore, when there arises a need to store other data in the memory in the course of inputting an expression in the calculation mode, it has not been possible to input or store that data without once exiting the calculation mode.

SUMMARY OF THE INVENTION

The computer of this invention, which overcomes the above-discussed and numerous other disadvantages and deficiencies of the prior art, has at least one operation modes, and further has: a data storage mode in which the contents and name of an input data are stored in a memory means; and a data retrieval mode in which a data stored in said memory means is retrieved by searching its name and the contents of the retrieved data are displayed, and comprises: a first mode change means for, in any of said operation modes, changing the mode of said computer from the current operation mode to said data storage mode, with holding the state of said current operation mode; a second mode change means for, in a predetermined operation mode, changing the mode of said computer from the current operation mode to said data retrieval mode, with holding the state of said current operation mode; and a data process means for making the contents of the data retrieved in said data retrieval mode to become the input data of said predetermined operation mode.

Another computer of this invention has at least a calculation mode and data retrieval mode, and comprises a first register for an input data, and a second register for an operand, the improvement exists in that said computer, and further comprises: a means for loading the contents of said first register into said second register, when a predetermined key operation is conducted in said calculation mode; a means for making the mode of said computer to be said data retrieval mode, after the contents of said first register are loaded into said second register; and a means for loading a retrieved data into said first register and making the mode of said computer to return to said calculation mode.

Thus, the invention described herein makes possible the objectives of (1) providing a computer which can store data with a name attached thereto, irrespective of the mode of the computer;

(2) providing a computer which can store data with a name attached thereto, in the course of a calculation mode;

(3) providing a computer which can retrieve stored data by the data name, and position the retrieved data at any portion of an expression to be performed; and (4) providing a computer which is easy to operate.

BRIEF DESCRIPTION OF THE DRAWINGS

This invention may be better understood and its numerous objects and advantages will become apparent to those skilled in the art by reference to the accompanying drawings as follows:

FIG. 3 illustrates an example of operation with the electronic calculator according to the invention.

FIG. 7 illustrates an example of operation with a another conventional electronic calculator.

DESCRIPTION OF THE PREFERRED EMBODIMENTS

Figures 5, 6:
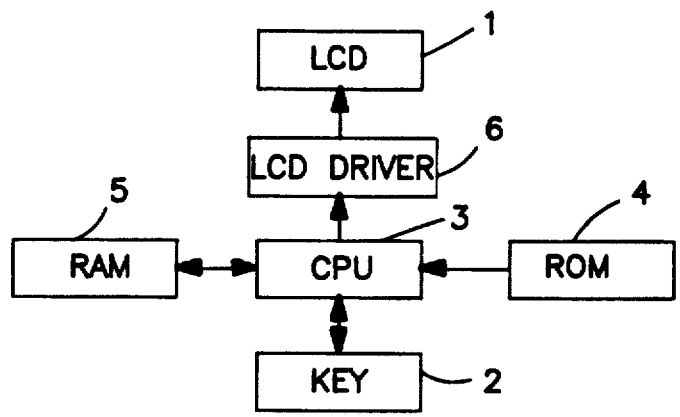
FIG. 5 is a block diagram showing the system configuration of the electronic calculator according to the invention.
FIG. 6 illustrates an example of operation with a conventional electronic calculator.

FIG. 5 is a block diagram of a scientific hand-held calculator according to the invention. A CPU 3 controls the operations of the calculator. A ROM 4 stores programs for the CPU 3. A RAM 5 has memory regions necessary for controlling the calculator and for storing numeric data and names for the stored data. An LCD driver 6 drives an LCD 1. A key unit 2 comprises various keys for inputting data and names and for controlling the calculator.

Figures 8A, 8B:
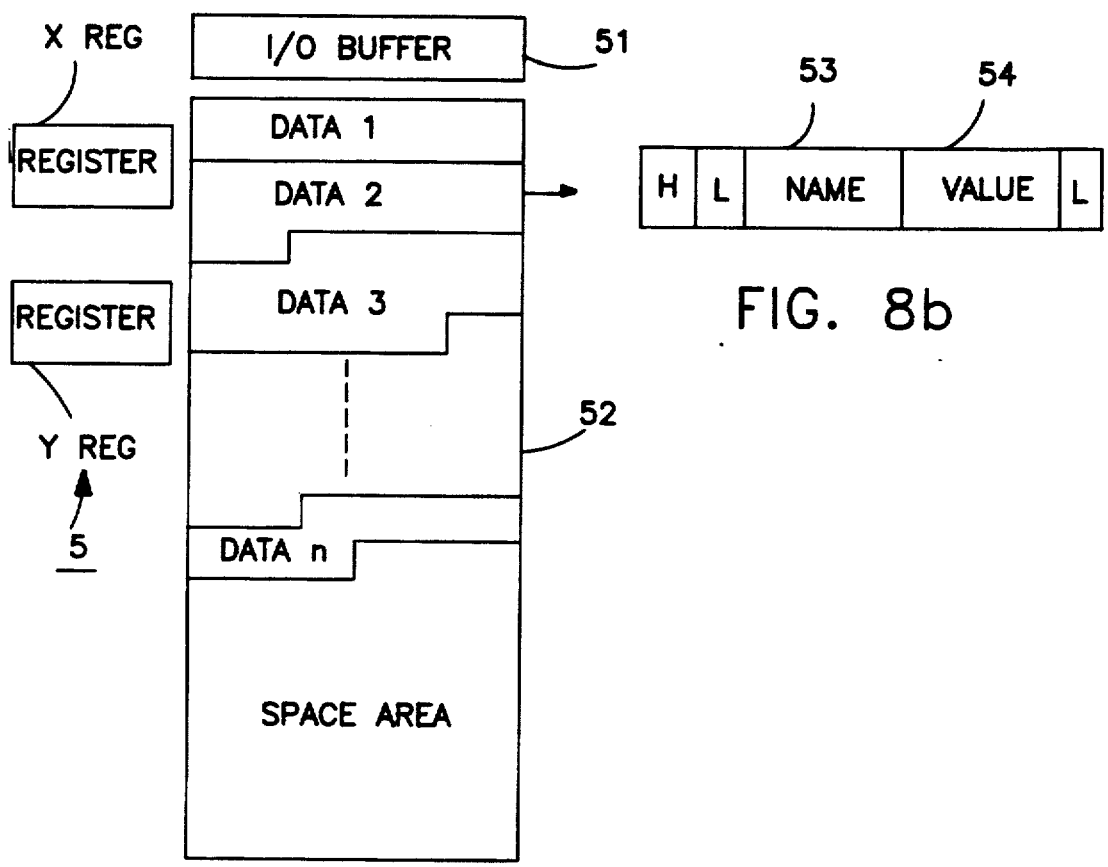
FIG. 8(a) and 8(b) are a schematic diagram for illustrating a memory device used in the electronic calculator according to the invention.

As shown in FIG. 8(a), the RAM 5 comprises a first arithmetic register $X_{reg}$, a second arithmetic register $Y_{reg}$, an input/output buffer 51, and a user data storage region 52. In the user data storage region 52, data 1 to n are stored. Each stored data has the format shown in FIG. 8(b), in which H denotes the header of the data which is used in a data retrieval, L the length of the data, 53 the name of the data (variable length), and 54 the numeric value of the data (fixed length).

Figure 4:
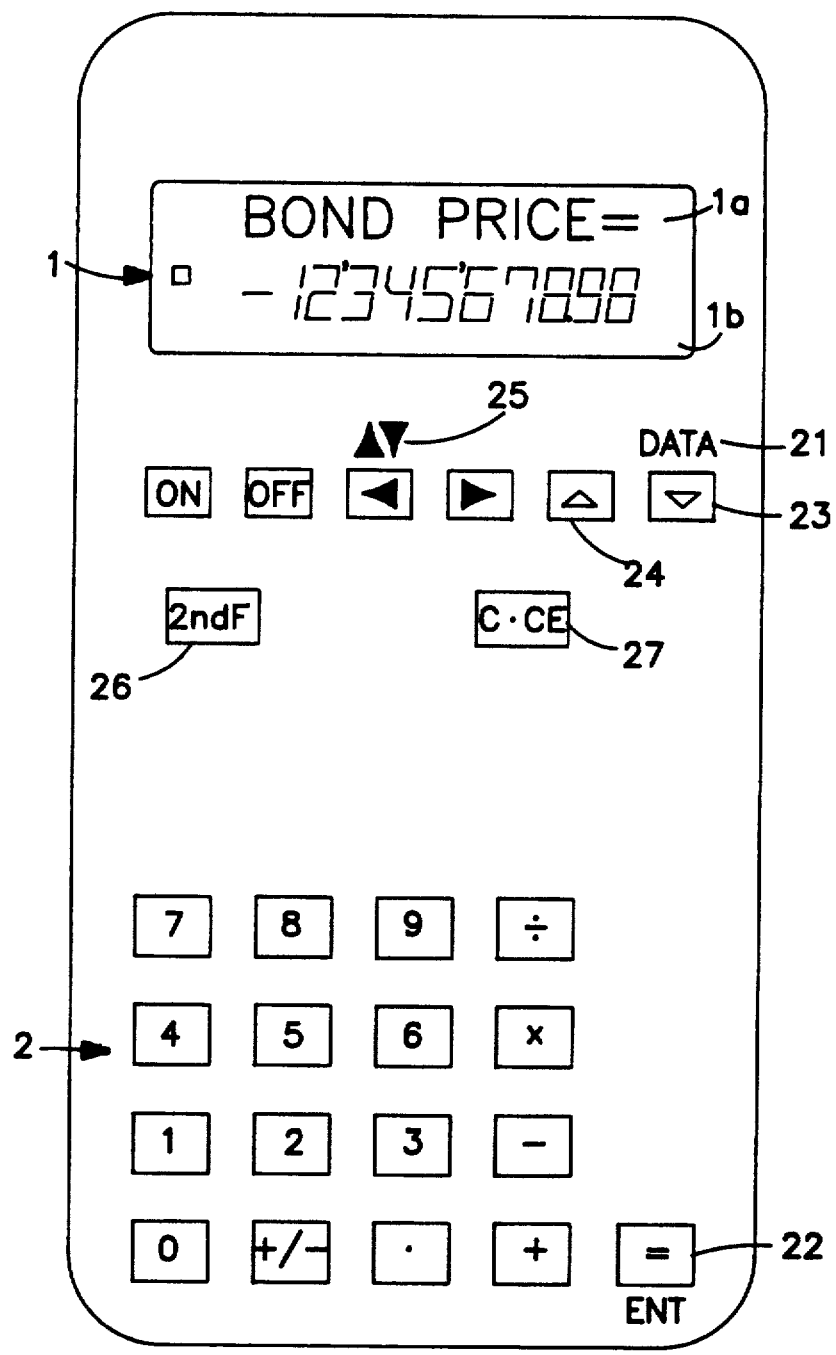
FIG. 4 is a schematic front view of the electronic calculator according to the invention.

FIG. 4 shows a front view of the calculator of FIG. 5. To simplify the explanation, FIG. 4 diagrammatically illustrates only the LCD 1 and specific keys necessary for describing the operations of the key unit 2, and thus keys and designation of keys unnecessary for the description are not illustrated in FIG. 4. The LCD 1 comprises a first display region 1a and a second display region 1b. The first display region 1a consists of a 12-figure dot matrix which is suitable for displaying a character string such as a data name or the like. The second display region 1b consists of 7-segment display elements, and can display the contents of a data. The key unit 2 comprises a key 22, a combination of a data mode selection [DATA] key 21 and a forward data search [∇] key 23, a backward data search [Δ] key 24, a cursor [▲ ▼] key 25, a second-function [2ndF] key 26, and a clear [C.CE] key 27. The key 22 functions as an entry [ENT] key or as an equal [=] key depending upon the mode of the calculator.

When the second-function [2ndF] key 26 and data mode selection [DATA] key 21 are pressed, a prompt "NAME?" is displayed in the first display region 1a to wait for inputting a data name. When a name is input, the name is set as the data name which is currently displayed in the second display region 1b. After a data name has been set, it is possible to modify the contents of the data provided with the data name, by operating the cursor key 25 to move the cursor to the first display region 1b and then inputting a new data.

The forward data search [∇] key 23 and backward data search [Δ] key 24 are used for retrieving a data with a data name. More specifically, the forward data search key 23 is operated to search the data name in alphabetical order, and the backward data search key 24 to search the data name in reverse alphabetical order. The calculator of this embodiment is also provided with a direct search function for searching by the initial character of a data name.

Figure 1:
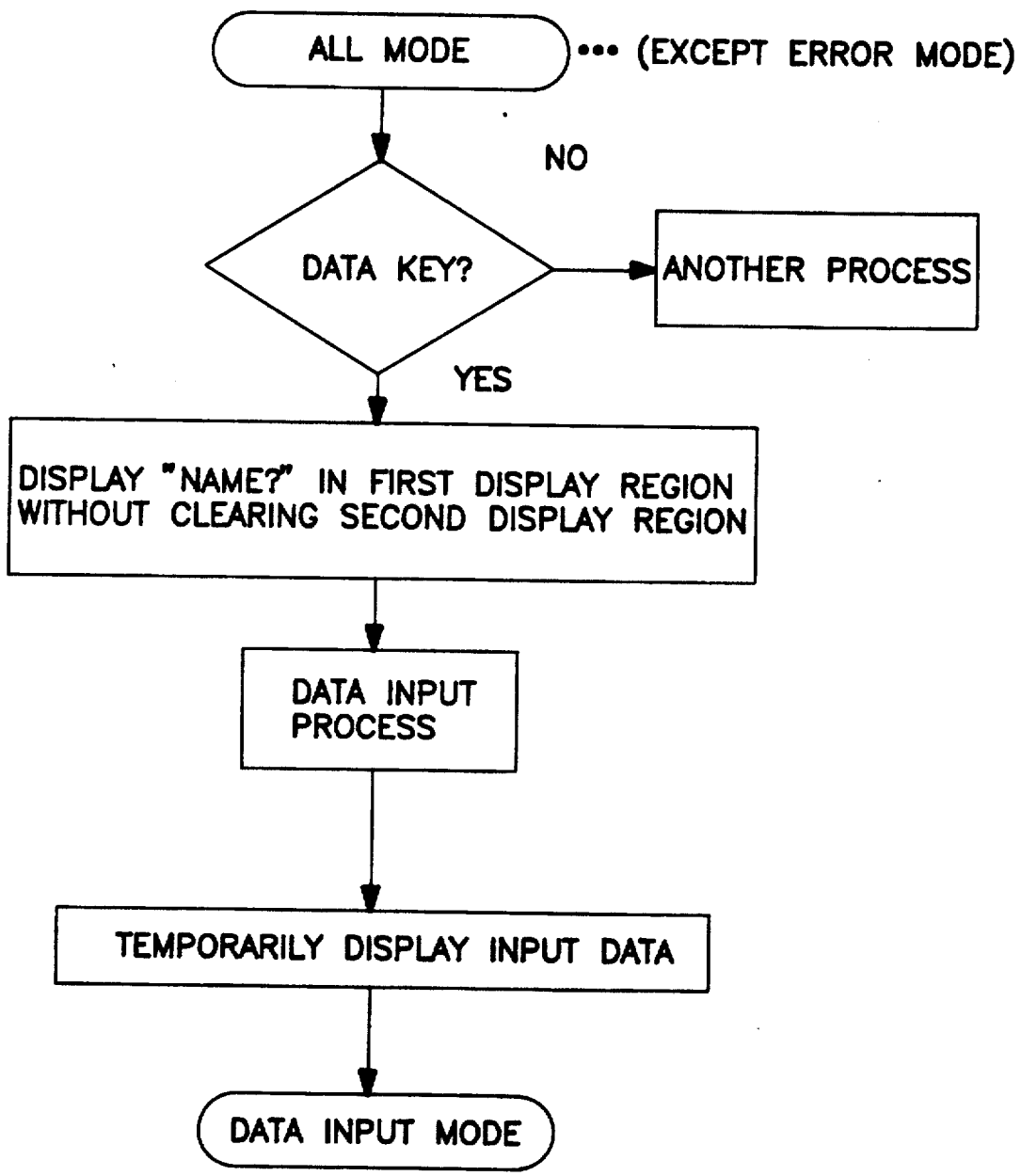
FIG. 1 and 2 are flowcharts of an electronic calculator according to the invention.

In the embodiment having the above-described configuration, it is possible to input the contents of a data and a data name in any of the operation modes (excluding the error state) by executing the algorithm shown in FIG. 1. When the second-function selector [2ndF] key 26 and the data mode selection [DATA] key 21 are pressed, the operation of the calculator enters the data input mode which is a part of the data storage mode, without destroying the expression(s) or numeric value(s) which have been stored or displayed, and the prompt "NAME?" is displayed on the first display region 1a. After the data name has been input, the process of inputting the contents of the data starts. The numeric value currently displayed in the second display region 1b can be input as the contents of the data, and the data name is given to the contents of the data. Alternatively, when the cursor key 25 is operated to move the cursor to the second display region 1b, the numeric value currently displayed can be modified, thereby allowing the input of another numeric value as the contents of the data. When the data input process has been completed, the contents of the input data and the data name are displayed.

Figure 9:
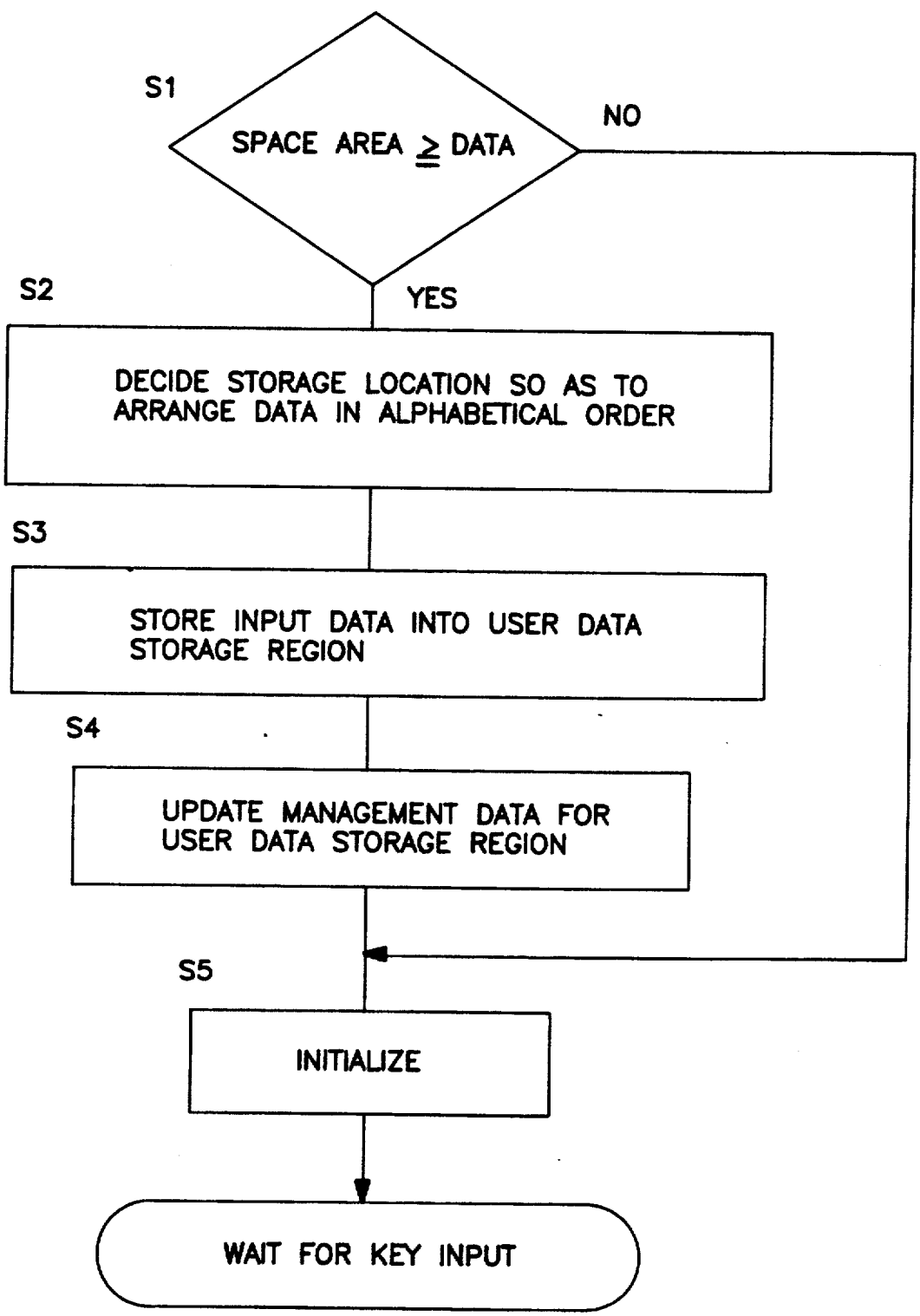
FIG. 9 is a flowchart of the data input process in the electronic calculator according to the invention.
Figure 10:
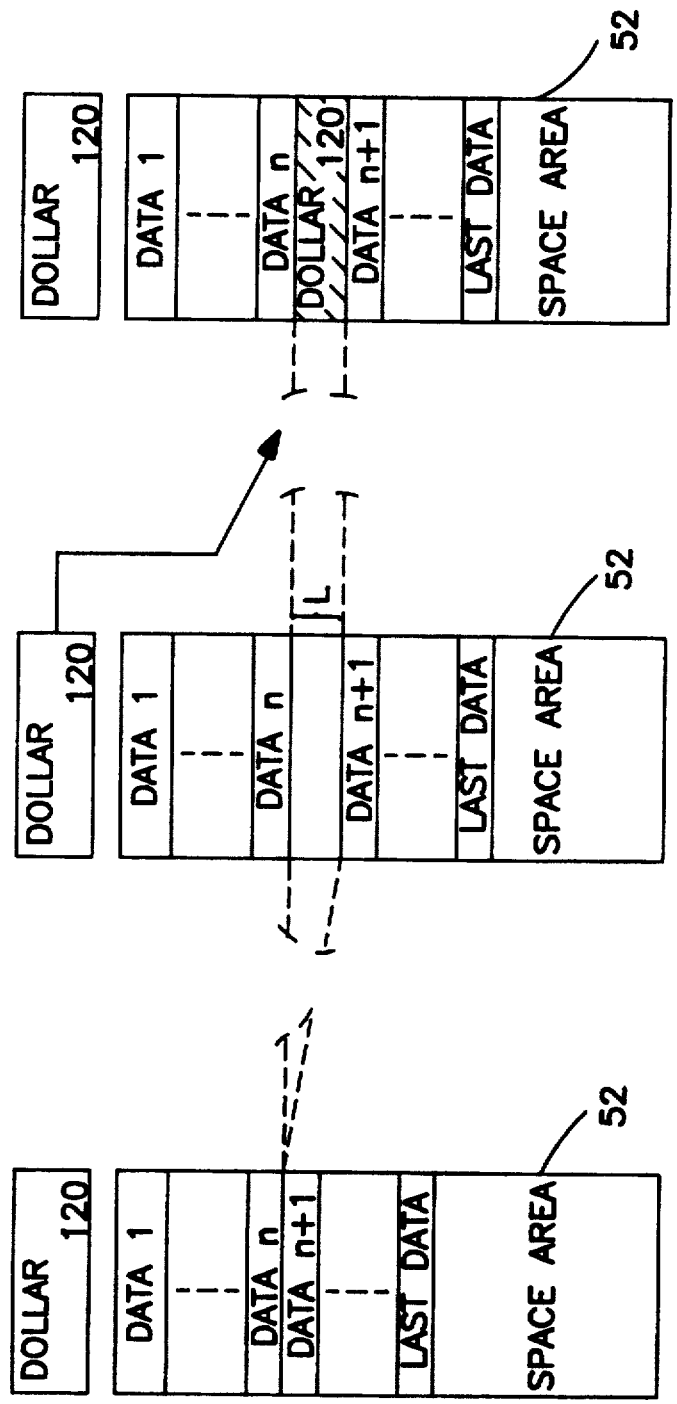
FIG. 10(a)-10(c) are a schematic diagram for illustrating the way of storing the input data in the memory device shown in FIG. 9.

The data input process will be described in more detail with reference to FIG. 9. First, the volume of the space area in the user data storage region 52 is checked whether it is sufficient for storing the input data (the total of the name and the contents) or not (step S1). In this case, the input data to be stored is "DOLLAR 120" (step 3 of FIG. 3). When the volume of the space area is not sufficient, the operation proceeds to step S5 to return to the initial mode. When the volume of the space area is sufficient, the operation proceeds to step S2. In step S2, the storage location of the input data is decided so that the data names H are arranged in alphabetical order. Then, the input data is stored in the user data storage region 52. The way of storing the input data is illustrated in FIGS. 10(a)-10(c). It is assumed that the input data is inserted between data n and data n+1. Data n+1 and all the succeeding data are shifted by the length L of the input data so that a space area for storing the input data is formed between data n and data n+1 (FIG. 10(b)). Then, the input data is transferred or copied to the thus formed space area (FIG. 10(c)). The management data for the user data storage region 52 is updated (step S4). Thereafter, in step S5, the mode of the calculator returns to the initial mode, and the display is initialized as shown in step 4 of FIG. 3. The state of waiting a key operation is set.

Figure 2:
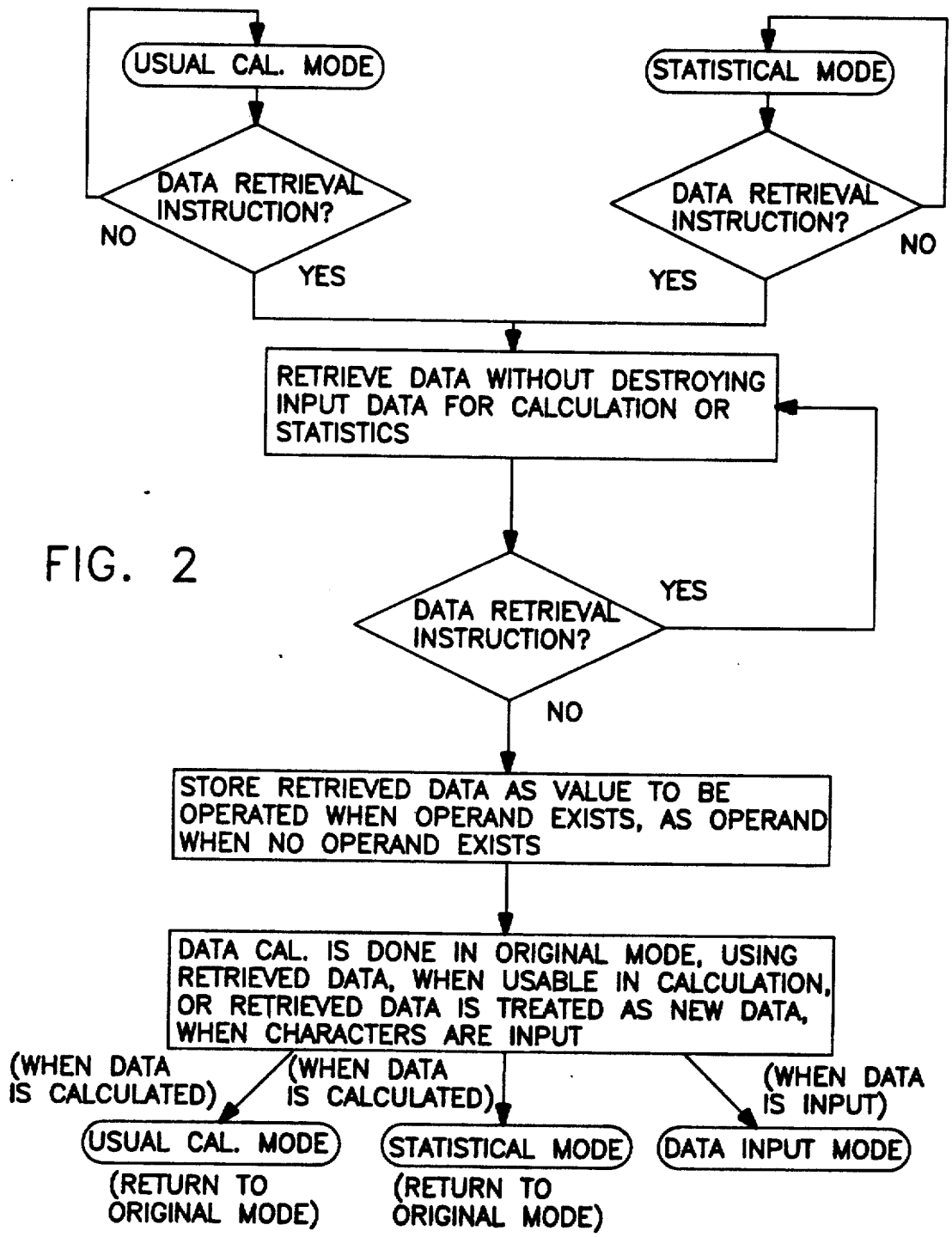

Furthermore, by executing the algorithm shown in FIG. 2, it is possible to retrieve stored data by a data name, and use it in a calculation mode such as the normal calculation mode, the statistic mode, or any other operation mode. When a data retrieval instruction is executed in any of these modes, a retrieval process is performed for the destination data without destroying expressions or data for an arithmetical or statistical operation which have been stored in the register for the arithmetical or statistical operation. The retrieved data is then stored in the memory for calculation. In the memory, when an operand exists, the data is stored as a value to be operated, and, when no operand exists, the data is stored as an operand. When the retrieved data is usable for data calculation, the calculation is performed in the mode which has been effective before execution of the data retrieval. When a numeric value or characters are input, the process for inputting new data is performed. After the completion of the above procedures, the process returns to the original mode.

Figure 11:
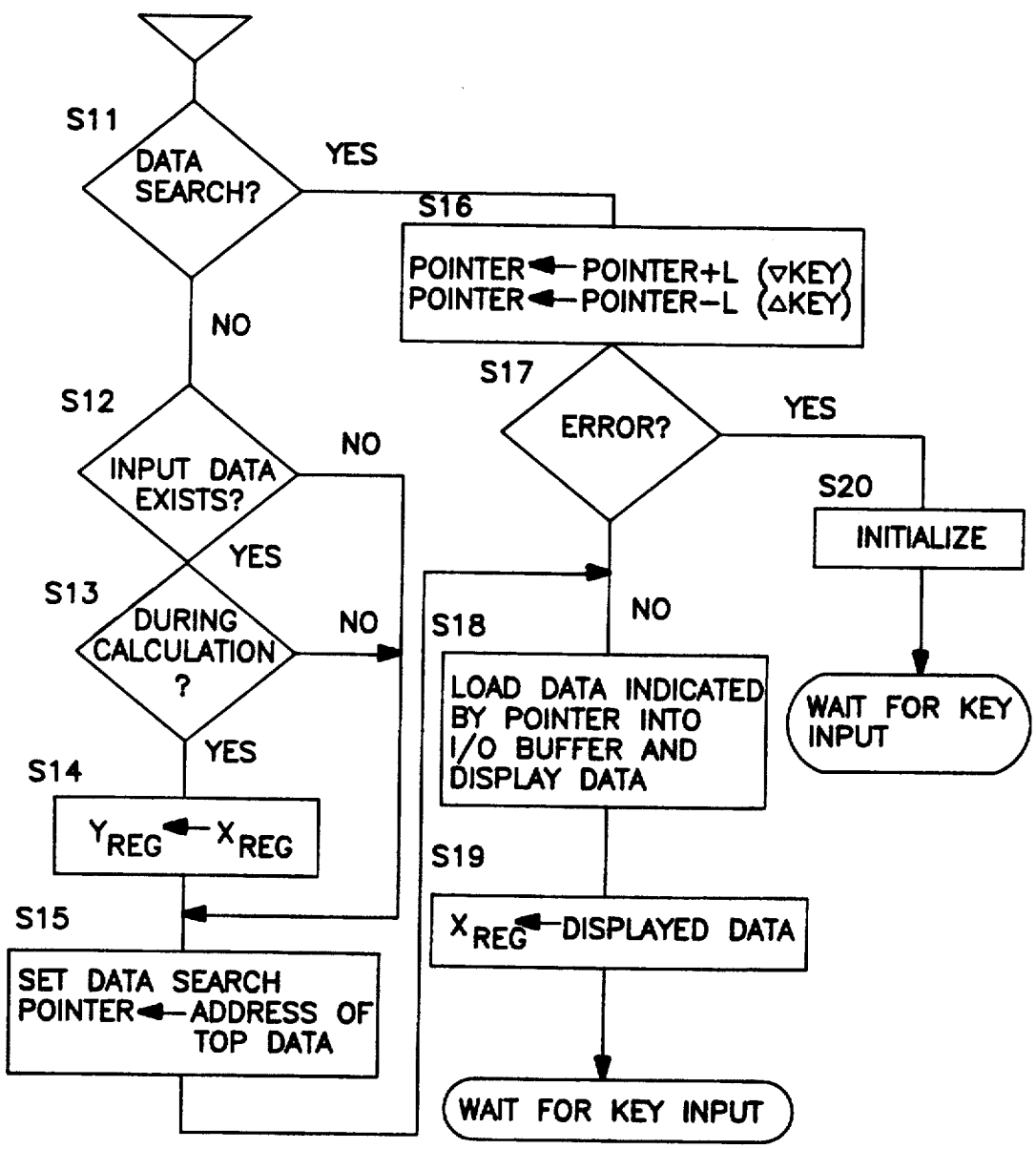
FIG. 11 is a flowchart of the process conducted when a data search key is operated in the electronic calculator according to the invention.

The process conducted when the data search key 23 or 24 is pressed will be described in more detail, referring to FIG. 11. When the data search key 23 or 24 is pressed, it is checked whether the mode is the data retrieval mode or not (step S11). If yes, the operation proceeds to step S16. If no, the judgment is conducted to check whether a data has been input or not (step S12). When an input data exists, a further judgment is conducted in step S13 to check whether an operator has been input. If yes, the input data (the contents of the first register $X_{reg}$) is loaded into the second register $Y_{reg}$ for an operand (step S14). Then, the mode is changed to the data retrieval mode, and the address of the top data is set in the pointer (step S15). If the answer is no in step S12 or S13, the operation proceeds directly to step S15. Thereafter, the operation proceeds to step S18, and the data indicated by the pointer is loaded into the input-/output buffer 51 so that the contents of the input/output buffer 51 is displayed (step S18). The displayed data is loaded into the first register $X_{reg}$ for an input data (step S19), and a further key operation is waited.

If the data search key 23 or 24 is pressed further, the operation proceeds from step S11 to step S16 so that the process for a conventional data retrieval is performed. When the forward data search key 23 is pressed, the address of the next data is set in the pointer, and, when the backward data search key 24 is pressed, the address of the preceding data is set in the pointer (step S16). When an error occurs, the operation proceeds from step S17 to step S20, to set the initial mode, and waits for a key operation. If there is no error, the operation advances to step S18.

An example of operation in the embodiment is shown in FIG. 3. In this example, the calculation of "1.6 ×120 = 192" is conducted. As described above, the prompt message "NAME?" is displayed in the first display region 1a by pressing the second-function selector [2ndF] key 26 and the data mode [DATA] key 21 (step 1). "DOLLAR" is input as a data name and displayed in the first display region 1a (step 2). Thereafter, the second-function selector [2ndF] key 26 and the cursor key 25 are pressed to move the cursor to the second display region 1b. Then, a numeric value "120" is input. The input value is displayed in the second display region 1b (step 4). By pressing the entry [ENT] key 22, the numeric value "120" is stored with the data name of "DOLLAR" (step 4). The clear [C.CE] key 27 is pressed to exit the data input mode and return to the calculation mode (step 5). Next, "1.6 ×" is input (step 6). The data name "DOLLAR" is searched by repeatedly pressing the forward data search key 23. When the data name "DOLLAR" and the contents of the data "120" are displayed, the user stops the operation of pressing the forward data search key 23 (step 7). Then, the equal [=] key 22 is pressed to execute the calculation, and the result is displayed (step 8).

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a computer having at least one operation mode, the improvement exists in that said computer further has:

a data storage mode in which the contents and name of an input data are stored in a memory means; and a data retrieval mode in which a data stored in said memory means is retrieved by searching its name and the contents of the retrieved data are displayed, and said computer comprises:

first mode change means for, in any one of said operation modes, changing the mode of said computer from said one operation mode to said data storage mode, while storing the state of said one operation mode;

second mode change means for, in a predetermined operation mode, changing the mode of said computer from a said one operation mode to said data storage mode, while storing the state of said predetermined operation mode;

data process means for making the contents of the data retrieved in said data retrieval mode to become the input data of said predetermined operation mode; and mode return means for returning, based on said stored state, the mode of said computer from said data storage mode or said data retrieval mode to said one operation mode or said predetermined operation mode.

2. In a computer having at least a calculation mode and data storage mode, and comprising a first register for an input data, a second register for an operand and a data storage region, the improvement exists in that said computer further comprises:

means for loading the contents of said first register into said second register, when a predetermined key operation is conducted in said calculation mode;

means for making the mode of said computer to be said data storage mode, after the contents of said first register are loaded into said second register;

means for conducting said data storage mode to store a new input data comprising a data name and data value to the data storage region; and means for loading said new input data into said first register and making the mode of said computer to return to said calculation mode.

* * * * *

UNITED STATES PATENT AND TRADEMARK OFFICE
CERTIFICATE OF CORRECTION

PATENT NO. : 5,155,815
DATED : 13 October 1992
INVENTOR(S) : Kawawaki et al.

It is certified that error appears in the above-identified patent and that said Letters Patent is hereby corrected as shown below:

```
On the title page, data item (54): please substitute "HOME"
                                    with --NAME--;
Column 1, line 2: substitute "HOME" with --NAME--;
Column 6, line 36: substitute "said one" with
                                    --predetermined--;
Column 6, line 37: substitute "storage" with
                                    --retrieval--.
```

Signed and Sealed this

Nineteenth Day of October, 1993

Attest:

BRUCE LEHMAN

*Attesting Officer*   *Commissioner of Patents and Trademarks*